Oct. 11, 1955    K. MAYBACH    2,720,193
OIL COOLED PISTON FOR HIGH SPEED INTERNAL COMBUSTION ENGINES
Filed Oct. 24, 1950    4 Sheets-Sheet 2

INVENTOR.
KARL MAYBACH.
BY
ATTORNEY.

Oct. 11, 1955    K. MAYBACH    2,720,193
OIL COOLED PISTON FOR HIGH SPEED INTERNAL COMBUSTION ENGINES
Filed Oct. 24, 1950    4 Sheets-Sheet 3
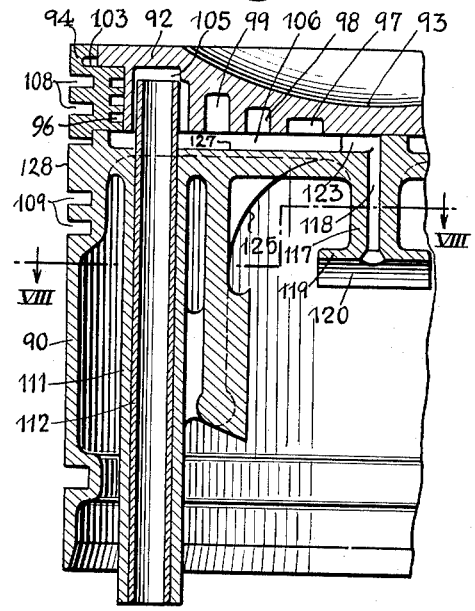
Fig. 7.
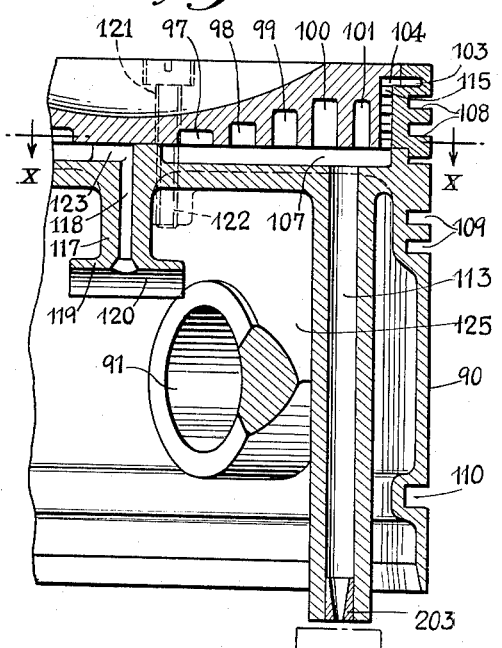
Fig. 9.
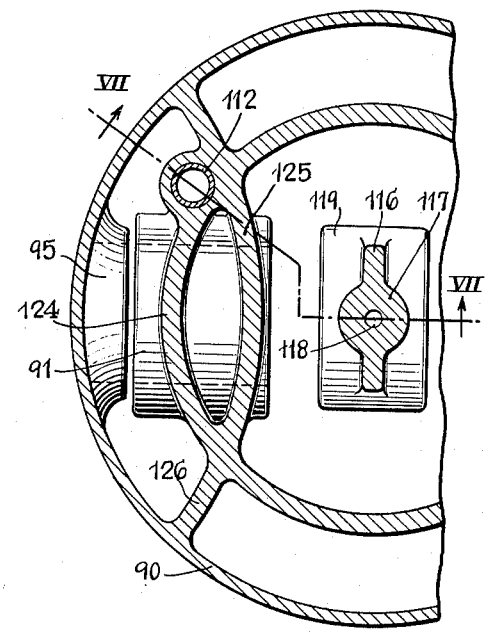
Fig. 8.
Fig. 10.
INVENTOR.
KARL MAYBACH.
BY
ATTORNEY.

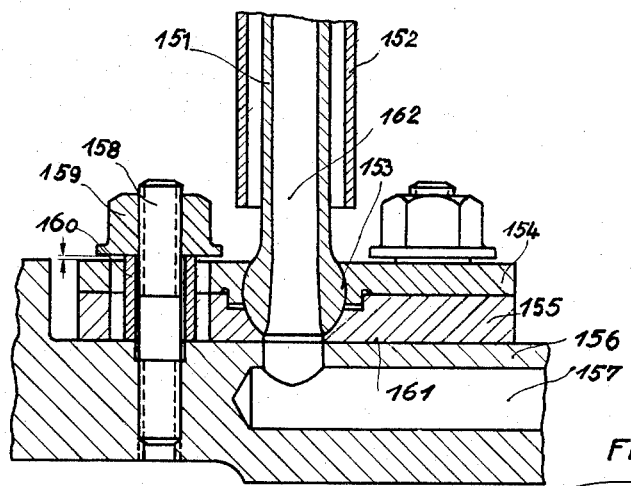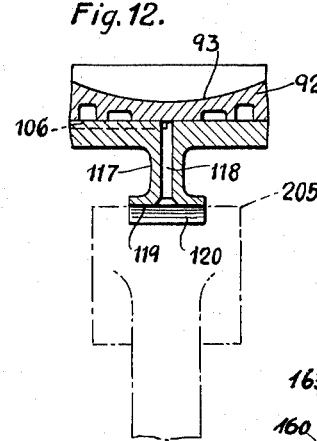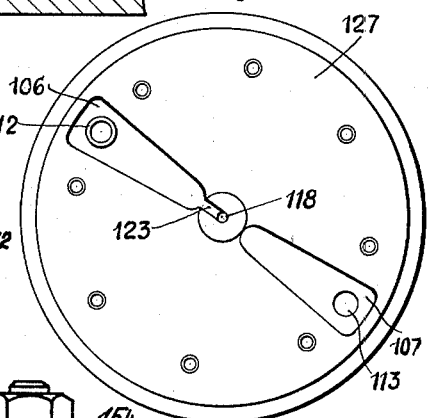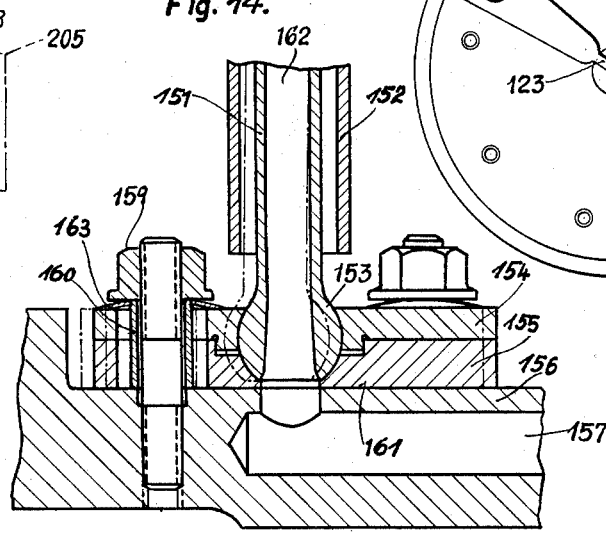

United States Patent Office 2,720,193
Patented Oct. 11, 1955

2,720,193

OIL COOLED PISTON FOR HIGH SPEED INTERNAL COMBUSTION ENGINES

Karl Maybach, Friedrichshafen am Boden See, Germany

Application October 24, 1950, Serial No. 191,779

Claims priority, application Germany March 24, 1950

26 Claims. (Cl. 123—41.36)

The present invention relates to an improved design for an oil cooled piston for high speed internal combustion engines, particularly for vehicles.

In the attempts to increase the power output of internal combustion engines operating accordnig to the Otto cycle by increasing the compression and eliminating knocking, and of diesel engines by eliminating sticking of the pistons and increasing the speed, difficulties have been encountered which are primarily due to the high temperature of the pistons, particularly at the ring belt, at the head, and also at the skirt.

It is an object of the present invention to provide a new piston for internal combustion engines which makes it possible to increase considerably the output of engines operating according to the Otto cycle, as well as of diesel engines, and assures economical opeartion at high loads during long periods of service without overhauling. The new piston is particularly suitable for engines for driving rail cars, locomotives, and busses.

An object of the invention is the provision of a piston for internal combustion engines which permits a considerable increase of the mean pressure effective on the piston and a reduction of the piston diameter, by making the piston of several parts, the head part being low and plate-shaped and having substantially annular and concentric conduits for the cooling fluid and one or two piston rings attached thereon.

The aforementioned head part is preferably made of steel and has relatively thin walls. It may be made in part or as a whole of light metal, for special applications. Cooling oil is forced through conduits in the piston head part in circumferential direction and in a circuit whose pressure is independent of that of the lubricating oil, the oil being circulated in such amounts that not only are the piston rings on the head part cooled effectively, but that also so little heat is transferred to the main part of the piston that its running surface can be made practically cylindrical over its whole length.

The highly effective cooling arrangement according to the invention permits the use of one or two piston rings considerably closer to the edge of the piston head than is possible in conventional constructions and making the piston head part, which carries the piston ring, lower. The thickness of the head part amounts to a very small fraction only of the total length and of the diameter of the piston. Cooling of the uppermost piston ring and the portion of the piston adjacent to it is further improved by the provision of a circumferential cooling channel above the ring.

The oil which circulates through the annular cooling channels of the head part of the piston at considerable pressure and velocity absorbs much more heat than conventional cooling systems. The cooling action on different portions of the cylinder head can be made different to answer special requirements by controlling the oil flow through the individual channels, and excessive cooling of certain sections can be avoided.

The weight of pistons according to the invention is not greater, in some cases it is even less, than that of conventional pistons of the same diameter, because no large wall sections are required for removing the heat and because the piston pin and its bearing can be made smaller than in conventional arrangements.

The main part of the piston can be made of light metal which may have little rigidity when subjected to heat. The head part can be made of several pieces which are connected by shrinking or welding.

According to the invention, a running or bearing portion is provided below the head portion of the piston, and therebelow additional piston rings are provided. In this way, a running surface is provided close to the piston head which is fully effective because of the intensive cooling action which considerably reduces heat transfer from the head part to the main part. The total length of available running surface is therefore much increased and subjected to a very small change of temperature, so that the whole running surface of the piston remains practically cylindrical. Because of the increased length of the running surface, the piston pin can be located approximately in the middle of the length of said surface and in an extremely favorable position with respect to the transfer of pressure to the cylinder bore. The center of the piston pin can be so located in pistons according to the invention that 40 to 50 per cent of the effective running surface is above the center of the pin. The total length of effective running surface can amount up to 90 per cent of the height or length of the piston. On the other hand, the piston can be made shorter than conventional pistons because of the favorable position of the piston pin and better contact of the running surface with the cylinder bore. The fit of the piston can be made very close.

The top edge of the head part does not run on the inside cylinder wall, even at full load, because of its effective cooling. It can be inserted with considerably smaller clearance than the top edge of conventional pistons. The head part is made of material having a low expansion coefficient, so that the clearance does not increase appreciably at partial loads. Though the uppermost piston ring is very close to the head surface of the piston, sticking of this ring does not occur, not even at the highest possible medium pressures on the piston and continued operation at full load, because of the cooling effect of the oil flowing through a channel above the piston ring and because of the small clearance above the piston ring.

The head part is preferably connected with the main part of the piston by means of a plurality of expansion bolts. The proportion of the length of the unthreaded cylindrical part of these bolts to the diameter thereof is preferably at least four to one.

The cooling conduits should be narrow to increase the velocity of the cooling oil. The long axis of the oblong cross-section of the channels, for example, the channels which are close to the periphery of the piston, according to the invention, may be parallel to the longitudinal axis of the piston or transverse thereto. The channels are preferably formed by inserting filler members into annular grooves in the head part, so that conduits are produced between the surfaces of the filler members and the interior walls of the grooves.

For good support of the weight of the piston and piston pin, as well as absorption of the combustion and mass pressures, the bosses for the pin bearing are carried from above by struts extending circumferentially in the piston and being broader on top than at the boss. This permits full utilization of the increased output made possible by the cooling effect of pistons according to the invention and permits increased operating speed. The bosses may be supported independently of the piston skirt, or ribs may be provided to prop the bosses against the skirt. With this construction, the diameter of the pin can be made smaller than in conventional pistons. The running surface of the skirt of a piston according to the invention does not appreciably change its shape.

Supply and removal of the cooling oil to and from the piston may be effected in several ways. Supply to, and possibly removal of the oil from, the cooling spaces are preferably effected by tube pumps which are known per se. Application of such pumps to high speed motors, however, was not possible hitherto because their capacity was too great causing undesired high delivery and suction pressures in the cooling chamber of the piston.

This is remedied in the present invention by making the tube connected with the crankcase conical, the smallest diameter being at the connected end. This configuration, together with the conventional ball support of the tube in the crankcase, allows for inaccuracies in the manufacture of the crankcase and oil supply parts, as well as for tangential movements of the piston, and facilitates insertion of the piston. A standpipe designed in this manner does not require special surfaces for its guidance in the countertube in the piston, a smoothing of the contacting edge being sufficient in most cases. For special applications, the top of the standpipe may be made ball-shaped.

If the ball bearing at the connection of the standpipe with the crankcase does not provide enough lateral moveability, this bearing may be inserted in a member which is slidable on its base. This member consists of two plates fastened to the base by bolts screwed in the base and having a nut above the upper plate which is tightened against a spacer tube surrounding the bolts and pressing on the base. The spacer tube is slightly longer (a few hundredths of a millimeter) than the total thickness of the plates, providing a little play for the latter which permits lateral displacement of the ball bearing support when the engine is first started. The small clearance and oil friction prevents further displacement during normal operation.

The same can be achieved by making the spacer tubes longer and inserting resilient washers between the nuts and the upper surface of the upper plate, which washers press the plates against the base.

The small inlet opening at the bottom end of the standpipe may continue upward into a conical tube portion, effecting a diffusor action to make up for the resistance to the flow of the cooling oil through the small inlet.

When the piston moves downward at maximum speed operation, a portion of the oil is forced through the inlet of the standpipe back into the supply conduit, whereas during the remainder of the piston stroke oil is conducted practically continuously into the piston cooling chamber, notwithstanding certain variations of pressure and amount.

A similar standpipe arrangement may be provided at the outlet of the cooling oil from the head part to prevent splashing about of the discharge oil in the crankcase. The bore of this arrangement may be cylindrical. Alternatively, a discharge pipe may be attached to the piston only, the pipe having a nozzle at its outlet, discharging a jet of oil into a cup placed in the crankcase from which the oil is removed in a conduit, so that there is little possibility of undesired splashing of the cooling oil.

The inlet and the outlet for the oil from the channels in the head part are arranged diametrically opposite at the periphery of the piston head, and the oil is conducted in opposite circular directions. A substantially radial inlet channel is provided for distributing the oil into the concentric semi-circular channels which extend from both sides of the radial channel. The oil is collected similarly in a radial outlet channel on substantially the same diameter as the distributing channel.

Shims are interposed between the main part and the head part of the piston for eliminating difference of clearance between the cylinder heads and the piston heads caused by manufacturing inaccuracies. These shims are fixed, according to the invention, together with the filler members forming cooling channels, to one part of the piston by means of screws. Therefore the shims remain connected with one piston part when the parts are separated and cannot be misplaced.

Flow of heat from the head part to the main part of the piston is effectively prevented by the arrangement according to the invention. The aforedescribed shims assist in the prevention of such heat flow. Special heat insulating layers may be interposed between the two parts of the piston.

Bores may be provided in the wall separating the cooling channels for receiving the bolts and affording access of cooling oil thereto, whereby the bolts are cooled and rigidity of the connection of the piston parts is assured.

The cooling system according to the invention permits diversion of cooling oil from the cooling channels to the bearings of the piston pin in the connecting rod and/or the piston. Enough cooling oil may be diverted so that the pin can be subjected to higher specific pressures, i. e. its dimensions can be reduced, and it can be fitted more closely than in conventional constructions.

The invention enables employment of oil temperatures of 100° to 150° centigrade, because the circuit of the cooling oil is separated from that of the lubricating oil, which latter circuit must be operated at much lower temperatures. The high temperatures of the cooling oil preclude undesired low temperatures of those parts of the piston head and the combustion chamber which require little cooling, so that combustion is not impaired. In spite of this, the system according to the invention, assures a favorable running surface of the main part of the piston and very little clearance, and considerably improves cooling of the periphery of the piston head as compared with conventional cooling systems. Only a small heat exchanger is required for recooling the cooling oil because of its high temperature. Flow of heat into the main part of the piston, which is made of light metal, may be so much reduced by the present invention and the cooling effect of the cylinder coolant may be kept so small that the temperature of the cylinder wall is higher than that of the running surface of the piston and that the direction of the heat flow, which hitherto was from the running surface of the piston to that of the cylinder bore, is reversed.

The high temperature of the cooling oil admitted as lubricating oil from the cooling chamber in the piston head to the piston pin bearings is not harmful. These bearings are much hotter in conventional construction due to the heat radiation from the insufficiently cooled piston head.

The improvements according to the invention can also be applied to two-cycle engines, the size and specific output of whose pistons is still more limited, because of excessive heating, than the size and output of pistons of four-cycle engines.

Further and other objects of the present invention will be hereinafter set forth in the accompanying specification and claims, and are shown in the drawings which, by way of illustration, show what I now consider to be preferred embodiments of the invention.

In the drawings:

Fig. 1 shows a longitudinal section taken along line I—I in Fig. 2 of a piston according to the invention, the left half of the figure showing a section taken through a piston pin boss, and the right half a section at an angle to the section shown in the left half; the lower part of the figure shows a section through the foot part of a standpipe forming a pump for supplying cooling oil according to the invention;

Fig. 4 is a fractional longitudinal sectional view of a modified piston according to the invention;

Figs. 6 and 6a show longitudinal sections of two modifications of the upper end of standpipes according to the invention;

Fig. 7 is a longitudinal fractional sectional view of a further modification of a piston according to the invention, the section being made along line VII—VII of Fig. 8, which shows a transverse section of the piston shown in Fig. 7 taken along line VIII—VIII of said figure;

Fig. 9 is another longitudinal sectional view of the piston shown in Figs. 7 and 8, the section being taken along line IX—IX of Fig. 10 which shows a transverse section of the piston along line X—X in Fig. 9;

Fig. 11 is a top view of the main part of the piston illustrated in Figs. 7 to 10;

Fig. 12 is a longitudinal sectional view of the center portion of the piston illustrated in Figs. 7 to 11;

Figs. 13 and 14 are longitudinal sectional views of modified foot portions of standpipes and their mountings as used in the system according to the invention.

Like parts are designated by like numerals in all figures of the drawings.

Figure 1:
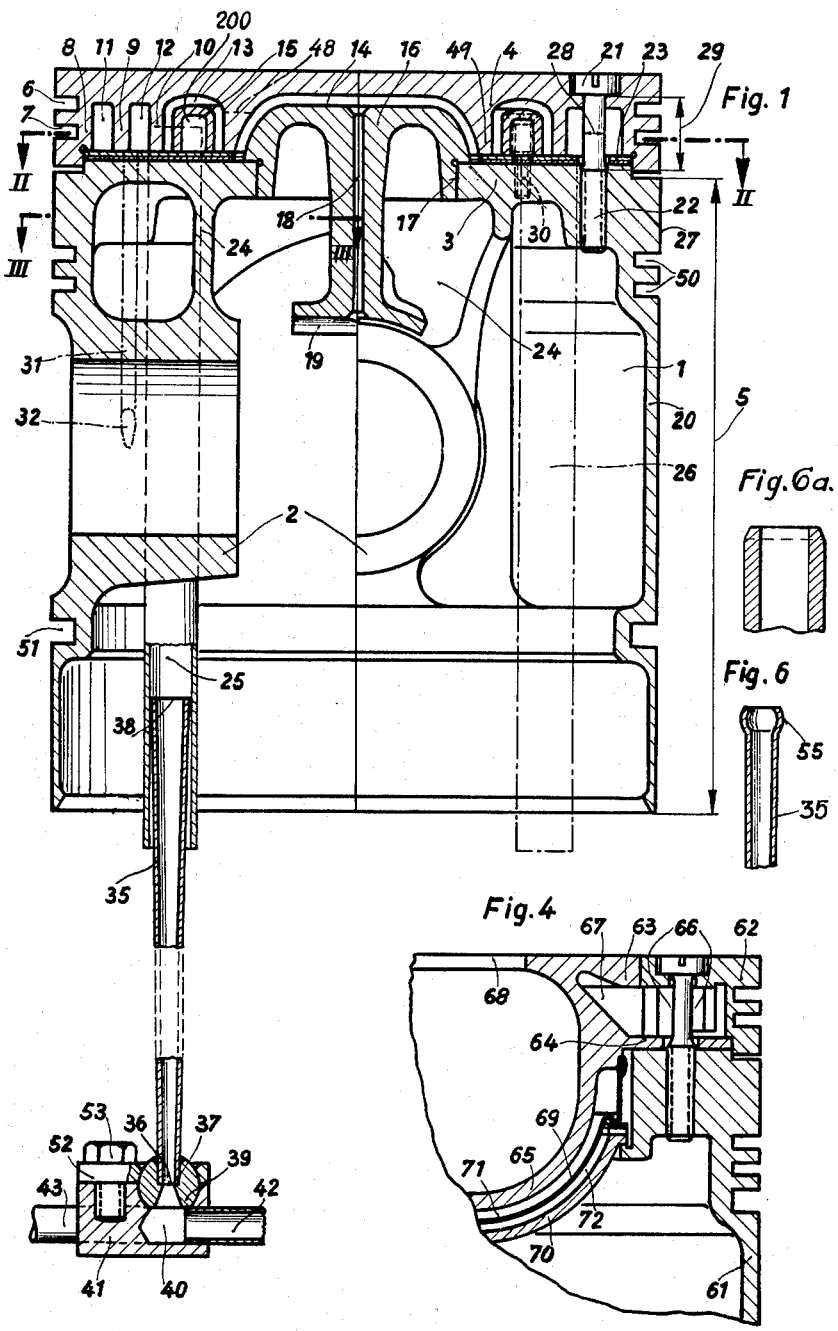
Figure 2:
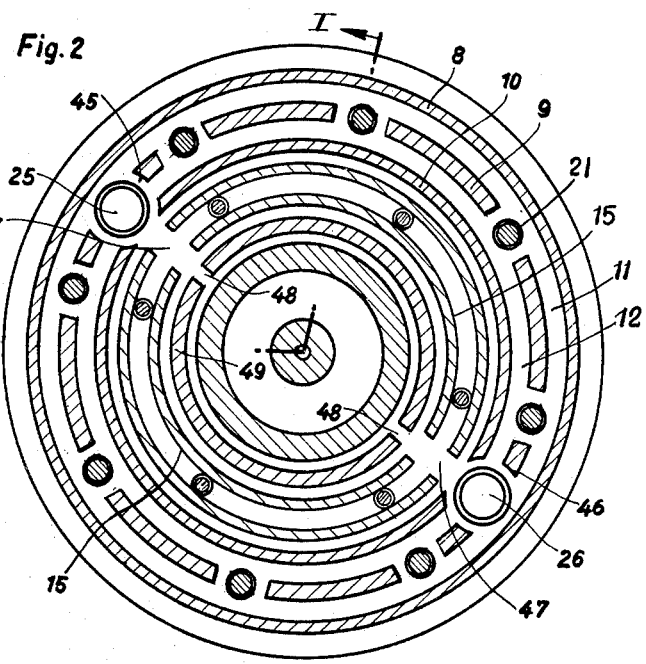
Fig. 2 is a cross-sectional view of the piston illustrated in Fig. 1, the section being made along line II—II in Fig. 1.
Figure 3:
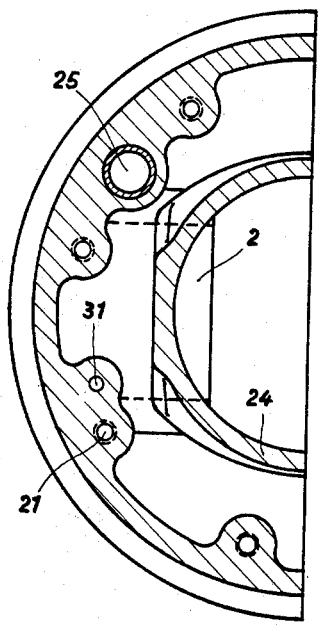
Fig. 3 shows one half of a section of the piston according to Fig. 1, the section being made along line III—III in Fig. 1, and the other half being symmetric to the one shown.

Referring more particularly to Figs. 1, 2, and 3, numeral 1 designates the main part of a piston according to the invention. Part 1 is hollow, its longitudinal wall forming the piston skirt 20. Pin bosses 2 extend inside part 1 and are connected with the top of the part by ribs 24. The top of part 1 has a central, axial bore 17 leaving a flange 3. The main part 1 forms a cylindrical running surface for the piston, the length of the surface being indicated at 5. Grooves 50 are provided in part 1 for receiving piston rings, the grooves being spaced from the top of part 1 by a running or bearing surface 27. A further groove 51 is provided in the lower part of part 1 for receiving an oil wiping ring.

The top of part 1 is covered by a plate-shaped head part 4 which is provided with grooves 6 and 7 for receiving piston rings. Annular ribs 8, 9, and 10 form annular channels 11, 12, 13 for the cooling oil. Channel 13 is larger than the other channels and has arcuate filler members 15 inserted for producing the desired flow area for the cooling oil. The filler members can be made of a very light alloy since they do not support anything. They may be hollow, have longitudinal grooves 200, radial recesses, or may be provided in greater numbers with gaps therebetween to provide radial flow of the cooling oil. Head part plate 4 has a central internal cavity for receiving a mushroom-shaped member 16 which is inserted in the bore 17 of flange 3 and has a central bore 18 extending longitudinally of the stem of mushroom member 16. The lower end of the stem of member 16 has an arc-shaped portion 19 covering the pin bearing of the connecting rod. The top of member 16 fits into the central cavity in plate 4, leaving a clearance 14 which serves as cooling conduit and as a conduit for conducting oil into the bore 18.

The head part 4 is connected with the main piston part 1 by means of expansion bolts 21 having a threaded portion 22 screwed into flange 3. The diameter 28 of the unthreaded part of bolts 21 is one third to one fourth of the length 29 of the unthreaded part to assure rigid connection of the head part with the main part at all operating conditions. As seen in Fig. 2, the annular rib 9 is interrupted adjacent to bolts 21 to afford communication between cooling oil conduits 11 and 12 and cooling of the bolts.

Shims 23 are interposed between the head plate 4 and the top of part 1 to compensate for inaccuracies in the head portion of the cylinder bore. These shims are secured together with the filler members 15 by screws 30 to the top of the main part. The head part can be removed from the main part by removing screws 21. The filler members and the shims remain fixed on the main part preventing confusion.

The length 5 of the running surface on the main part of the piston amounts to about 85 to 90 per cent of the total length of the piston and is considerably greater than that of conventional pistons. It should be noted that the cylindrical surface 27 at the upper end of the main piston part is a fully effective running or bearing surface. In a piston according to the invention, the temperature drops very little over the length of the running surface, and the clearance between said surface and the cylinder bore can be made very small. The piston can be formed almost as a true cylinder. Its pin is in an especially favorable position for transmitting pressure. In the piston according to the invention, 40 to 50 per cent of the running or bearing surface of the piston, which is fully effective at all load conditions, are placed above the center line of the piston pin. For the reasons set forth above, the total length of the piston can be made smaller than that of pistons of conventional design.

Cooling oil is supplied to conduits 11, 12, 13 through a tube 25 and removed therefrom through tube 26. Ribs 9 and 10 are interrupted at 45 and 46 adjacent to the termination of tubes 25 and 26 in the head part 4 to produce a distributing chamber at the oil inlet and a collecting chamber at the oil outlet. For the same reason, gaps 47 are provided between the filler members 15, and radial ports 48 are arranged in rib 49, the latter separating channels 13 and 14.

Tube 25 extends over a standpipe 35 and produces a pumping effect when the piston is reciprocated. The inlet bore 36 at the lower end 37 of tube 25 is considerably smaller than the outlet bore 38 at the upper end, the diameter of the inlet 36 being about one quarter to one third of that of the outlet 38. Tube 35 thus has a conical configuration and produces a diffusor effect which counteracts the flow resistance of the oil. The upper end of tube 35 does not require a special guide surface but may be provided with a slanted annular surface as shown in Fig. 6a. In large installations, the upper end of tube 35 may be ball-shaped as indicated at 55 in Fig. 6. The lower end 37 of tube 35 is mounted in a ball 39 having an aperture communicating with cavity 40 in a base member 41. Oil is supplied to cavity 40 through conduit 42, and the oil not diverted into tube 35 continues to flow through pipe 43 to base members for the standpipes of cooling oil pumps of other pistons. The lower part of ball 39 is fitted in a correspondingly shaped cavity in base member 41. The ball is held to the base member by a plate 52 having an aperture fitting over the upper part of ball 39 and being secured to base 41 by a bolt 53. The ball bearing arrangement at the foot of tube 35 permits swinging of the tube to allow for minor manufacturing and assembly inaccuracies.

The support of the foot portion may be modified according to Fig. 13 or Fig. 14. In these modifications, the ball-shaped lower end 153 of the standpipe 151 is inserted between two plates 154 and 155, which, together, have a cavity closely fitting over the ball portion 153. Plate 155 is laterally movable on the surface 161 of a base member 156 having an inlet 157 communicating with the bore 162 in the standpipe 151. A tube 152, corresponding to tube 25 in Fig. 1 and being connected with the head part of a piston according to the invention, extends over the standpipe 151. Plates 154, 155 are secured to base member 156 by studs 158. Nuts 159 are tightened on studs 158 against tubular spacer members 160 inserted between the nuts and the base member. A spacer member is only a few hundredths of a millimeter longer than the combined thickness of plates 154, 155 so that there will be a little play permitting lateral movement of the plates and of the standpipe fitted therein when nut 159 is tightened against member 160. This movement serves for properly aligning the standpipe and its support with the tube connected with the piston, when the engine is started the first time.

In the modification shown in Fig. 14, resilient washers 163 are added between nuts 159 and the upper plate 154. These washers are compressed until the nuts abut the spacers 160. The lateral movement of the foot of the standpipe with its support plates is indicated by dash-dotted lines in Fig. 14 and is limited by the difference between the outside diameters of members 160 and the diameters of the bores in plates 154, 155.

The upper end of a bore 31 in the main part of the piston communicates with a cooling oil channel in the head part of the piston and the lower end 32 terminates in a piston pin bearing for conducting oil thereto for lubrication.

In the modification illustrated in Fig. 4, the head part of the piston is composed of two concentric pieces: a marginal piece 62 and a center piece 63 having a cavity 65 forming a combustion chamber. Both pieces are connected by shrinking or welding. A flat flange 64 extends radially from the wall of combustion chamber 65, which flange closes the bottom of cooling channels 66 provided in the head part. Flange 64 is abutted from below by the top of the main part of the piston forming the skirt 61.

A cooling channel 67 in the head part extends all around the upper part of the combustion chamber 65 effectively cooling this part and particularly the opening 68 thereof. The lower part of the combustion chamber is surrounded by a jacket formed by a cup member 70 in the center of the upper part of the main part of the piston. The jacket is divided into two chambers 71 and 72 by a thin walled pot member 69 which completely encloses chamber 71 which contains air. Chamber 72 is connected for oil flow with the cooling oil circulating system. Proper dimensioning of chambers 71 and 72 will produce the most desirable temperature of the combustion chamber wall.

Figure 5:
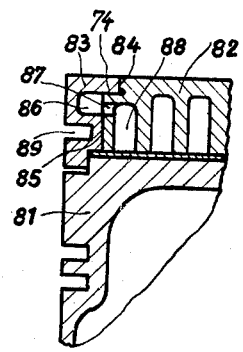
Fig. 5 is a fractional longitudinal sectional view of another modification of a piston according to the invention.

Fig. 5 illustrates another modification according to the invention. Here, the head piece is also composed of two concentric pieces, a center piece 82 and a marginal piece 83 which is shrunk to the center piece at 84 and 85. The relative axial position of pieces 82 and 83 is determined by a radial annular surface 74. Piece 83 is provided with a channel 86 having an oblong cooling flow area whose long axis is transverse to the piston axis, the channel being above the groove 89 for a piston ring. Channel or conduit 86 receives cooling oil through ports 87 from a channel 88 having an oblong flow area whose long axis is parallel to the piston axis. This arrangement cools the uppermost piston ring very effectively. The head part is mounted on top of a main piston part 81.

The modification of a piston illustrated in Figs. 7 to 11 comprises a main part having a running or bearing surface 128 at its upper end continuing in a skirt 90 provided with grooves 109 for piston rings and a groove 110 for an oil wiping ring, piston pin bosses 91 spaced from the skirt, and bosses 95 internally projecting from the skirt. Bosses 91 are propped against the top 127 of the main piston part by struts 124 and 125 which are wider on top than at the boss. Strut 124 is curved coaxially with the piston skirt. Lateral pressure of the bosses is transferred to the piston skirt by webs 126, the webs being fused with those parts of the piston skirt which are always in contact with the cylinder bore, so that the pressure is transferred thereto. The piston pin need not be longer than the distance between the outer vertical surfaces of bosses 91. The bending stresses of the pin are therefore smaller than in conventional designs, and the pin can have a smaller diameter. The small bosses 95 connected with the piston skirt are provided for protecting the latter when the pin is inserted.

The top 127 of the main part of the piston is provided with a radial recess 106 for distributing the oil supplied through pipe 112 into cooling channels in the head part of the piston which will be described later. Pipe 112 is inserted in an enlargement of the web and strut supporting a boss 91. Recess 106 communicates through a channel 123 with the axial bore 118 in a downwardly extending conduit 117 whose end is provided with a curved shield 119 having an interior surface 120. The latter conforms with the outside of the piston pin bearing 205 (Fig. 12) in the connecting rod and serves for assuring flow of oil thereunto for lubrication. Conduit 117 is re-enforced by a rib 116.

There is a second radial recess 107 in the top of the main piston part which serves to collect the cooling oil from the conduits in the head part of the piston. The oil is removed from recess 107 through conduit 113. The lower end of the latter is preferably provided with a nozzle 203 discharging the oil in the form of a jet into a funnel 204. This prevents splashing of discharged cooling oil and mixture thereof with lubricating oil in the crankcase.

A head part is mounted on top of the main part and comprises a central piece 92 having an external cavity 93 and being secured to the main part by bolts 121 having a thread 122 screwed into the main part. The center piece 92 is surrounded by a marginal piece 94. The center piece 92 is provided with coaxial annular cooling oil channels 97, 98, 99, 100, and 101. The marginal piece 94 has superimposed channels 96 and a channel 103 close to the upper outer edge of the head part. The channels in the marginal piece have an oblong flow area, the long axis of which extends transversely to the piston axis. Annular channel portions 104 communicating with channel 103 are provided in the center piece 92. Ribs 115 which separate channels 96 have interruptions 114 to permit flow of oil from one channel 96 into another channel 96. The annular rib separating channels 100 and 101 is interrupted at 105 for providing a chamber in which the outlet of the oil supply pipe 112 terminates.

The cooling oil flows from pipe 112 into recess or chamber 106 whence it enters channels 97, 98, 99, 100, 101, as well as channels 96, 104, and 103, in two opposite circumferential directions. After passing through the two half portions of the annular channels, the oil is collected in recess 107 and removed through conduit 113. A small portion is diverted through conduit 123 into the bore 118 for lubricating the piston pin bearing in the connecting rod.

While I believe the above described embodiments of my invention to be preferred embodiments, I wish it to be understood that I do not desire to be limited to the exact details of method, design and construction shown and described, for obvious modifications will occur to a person skilled in the art.

I claim:

1. An oil cooled piston for internal combustion engines having a crankcase, said piston comprising a head part, at least one groove for receiving a piston ring on said head part, a plurality of substantially annular cooling conduits in said head part, a main part having a running surface adjacent to said head part, and a plurality of expansion bolts interconnecting said head part and said main part and having surface portions extending through said conduits and cooling oil supply and discharge means connected with said main part and communicating with said conduits and being separated from the engine crankcase with respect to oil flow.

2. An oil cooled piston for internal combustion engines having a crankcase, said piston comprising a flat, substantially plate-shaped head part, at least one piston ring groove thereon, a plurality of individual, concentric, semi-annular cooling conduits in said head part, and cooling oil supply and discharge means connected with the piston and communicating with said conduits, said supply and discharge means being separated from the engine crankcase with respect to oil flow, at least one of said conduits having an oblong flow area whose long axis extends radially of the longitudinal axis of the piston.

3. An oil cooled piston for internal combustion engines having a cranckcase, said piston comprising a flat head part, at least one piston ring groove thereon, a plurality of substantially concentric annular cooling conduits in said head part, and cooling oil supply and discharge means connected with the piston and communicating with said conduits, said supply and discharge means being separated from the engine crankcase with respect to oil flow, the flow area of the outermost of said conduits being oblong, the long axis of said area extending substantially radially of the longitudinal axis of the piston.

4. An oil cooled piston for internal combustion engines, comprising a substantially plate-shaped head part, an annular channel in said head part, an annular filler member inserted in said channel and having a surface spaced from the wall of said channel for forming a conduit, and cooling oil supply and discharge means connected with the piston and communicating with the space between said channel and said filler member.

5. An oil cooled piston for internal combustion engines, comprising a head part, at least one piston ring groove thereon, substantially annular cooling oil conduits in said head part, a substantially hollow main part having a portion connected with said head part, piston pin bosses disposed in said main part, strut means connecting said bosses with said portion and being curved substantially concentrically with said main part, and cooling oil supply and discharge means connected with said main part and communicating with said conduits.

6. An oil cooled piston as set forth in claim 5, said strut means being wider adjacent to said portion than adjacent to said bosses.

7. An oil cooled piston for internal combustion engines, comprising a head part, at least one piston ring groove thereon, substantially annular cooling oil conduits in said head part, a substantially hollow main part connected with said head part and having a skirt portion, piston pin bosses disposed in and connected with said main part in spaced relation to said skirt portion, and cooling oil supply and discharge means connected with said main part and communicating with said conduits.

8. An oil cooled piston as set forth in claim 7, comprising web portions interposed between said bosses and said skirt portion.

9. An oil cooled piston for internal combustion engines having a crankcase, said piston comprising a plate-shaped head part, at least one piston ring groove thereon, a plurality of annular cooling conduits in said head part, conduit means interconnecting said annular conduits, and cooling oil supply and discharge means connected with the piston and terminating at substantially diametrically opposed points in said head part and communicating with said conduits, said supply and discharge means being separated from the engine crankcase with respect to oil flow, said supply means comprising a standpipe and a tube connected with the piston and being longitudinally slidable on said standpipe the flow area of said tube being greater than that of said standpipe.

10. An oil cooled piston as defined in claim 9, said supply means comprising support means movable in a direction transverse to the longitudinal axis of said standpipe and the latter having a foot portion fitted in said support means.

11. An oil cooled piston as set forth in claim 10, said support means comprising a stationary base member, two adjacent plates slidable on said stationary member and together having a spherical cavity, the foot portion of said standpipe being substantially ball-shaped and fitting into said cavity, a bore extending through said two adjacent plates, a spacer tube loosely fitting into said bore and resting on said base and being slightly longer than the combined thickness of said two plates, a bolt extending through said spacer tube and being screwed into said base, and a nut screwed on said bolt and tightening said spacer tube to said base and extending over said plates holding them to said base with a slight play for affording lateral movement of said plates and said standpipe fitted therein.

12. An oil cooled piston as set forth in claim 10, said support means comprising a stationary base member, two adjacent plates slidable on said stationary member and together having a spherical cavity, the foot portion of said standpipe being substantially ball-shaped and fitting into said cavity, a bore extending through said two adjacent plates, a spacer tube loosely fitting into said bore and resting on said base and being slightly longer than the combined thickness of said two plates, a bolt extending through said spacer tube and being screwed into said base, a nut screwed on said bolt outside said spacer tube, and an axially resilient washer interposed between said nut and said plates for pressing the latter together and against the base upon tightening of said nut.

13. An oil cooled piston for internal combustion engines having a crankcase, said piston comprising a head part, at least one piston ring groove thereon, a plurality of annular cooling conduits in said head part, and cooling oil supply and discharge means connected with the piston and communicating with said conduits, said supply and discharge means being separated from the engine crankcase with respect to oil flow, said supply means comprising a tube connected with said head part, and a longitudinally stationary standpipe having a conical outside configuration, the larger diameter end of said standpipe being longitudinally slidably inserted in said tube.

14. An oil cooled piston for internal combustion engines having a crankcase, said piston comprising a head part, at least one piston ring groove thereon, a plurality of annular cooling conduits in said head part, and cooling oil supply and discharge means connected with the piston and communicating with said conduits, said supply and discharge means being separated from the engine crankcase with respect to oil flow, said supply means comprising a tube connected with said head part, and a conical longitudinally stationary standpipe having its larger diameter end longitudinally slidably inserted in said tube, the bore of the larger diameter end of said standpipe having a diameter three to four times as large as the diameter of the bore of the small diameter end.

15. An oil cooled piston for high speed internal combustion engines, comprising a head part, at least one piston ring groove thereon, a plurality of substantially annular and coaxial cooling oil conduits disposed in said head part substantially coaxially with the longitudinal axis of the piston, a main piston part connected with said head part, and shims interposed between said head part and said main part.

16. An oil cooled piston for internal combustion engines, comprising a head part, an annular channel in said head part, an annular filler member inserted in said channel and having a surface spaced from the wall of said channel for forming a conduit, a main piston part connected with said head part, shims interposed between said head part and said main part, bolts securing said filler member as well as said shims to one of said parts, and cooling oil supply and discharge means connected with said main part and communicating with the space between said channel and said filler member.

17. An oil cooled piston for high speed internal combustion engines, comprising a head part, at least one piston ring groove thereon, a plurality of substantially annular and coaxial cooling oil conduits disposed in said head part, a main piston part, and bolts connecting said head part and said main part and extending between two neighboring cooling oil conduits, said neighboring conduits being interconnected adjacent to said bolts for cooling the latter by cooling oil flowing between the neighboring conduits.

18. An oil cooled piston for high speed internal combustion engines, comprising a head part, at least one piston ring groove thereon, a plurality of substantially annular and coaxial cooling oil conduits disposed in said head part, a main piston part, and expansion bolts interconnecting said head part and said main part and having a cylindrical unthreaded portion whose length is at least four times the diameter of the cylindrical portion.

19. An oil cooled piston for internal combustion engines, comprising a head part, at least one piston ring groove thereon, substantially annular cooling oil conduits in said head part, a substantially hollow main part connected with said head part, a piston pin in said main part, a bearing for said pin, conduit means connecting said conduits with said bearing for diverting cooling oil to the latter for lubrication thereof, and cooling oil supply and discharge means connected with said main part and communicating with said conduits.

20. An oil cooled piston for high speed internal combustion engines, comprising an individual head part having an uncooled and a cooled wall portion, at least one piston ring groove on said head part, cooling oil conduits in said head part adjacent to said cooled wall portion, a main piston part connected with said head part, said uncooled portion of said head part extending into said main piston part, jacket means disposed adjacent to said uncooled wall portion reducing heat radiation therefrom, and cooling oil supply and discharge means connected with said main part and communicating with said conduits.

21. An oil cooled piston for high speed internal combustion engines, comprising a head part having an uncooled and a cooled wall portion, at least one piston ring groove on said head part, cooling oil conduits in said head part adjacent to said cooled wall portion, a main piston part connected with said head part, jacket means disposed adjacent to said uncooled wall portion reducing head radiation therefrom, wall means dividing said jacket means in a chamber proximal to said uncooled wall portion and a chamber distal with respect to said uncooled wall portion, said last mentioned chamber communicating with said cooling oil conduits for circulating cooling oil therethrough, and cooling oil supply and discharge means connected with said main part and communicating with said conduits.

22. An oil cooled piston for internal combustion engines comprising a substantially plate shaped head part, piston ring grooves on said head part, a plurality of concentric and substantially annular cooling channels in said head part, a cooling oil supply means terminating in the outermost of said channels and discharging cooling oil thereinto in opposite circumferential directions, and a cooling oil relief means terminating in the outermost of said channels substantially diametrically oppositely to said supply means and receiving cooling oil from said channels in two opposite circumferential directions.

23. An oil cooled piston according to claim 22, comprising cooling oil conduit means individually extending substantially radially from said supply means and from said relief means toward the center of said head part and interconnecting said channels for oil flow from said supply means to said relief means through said channels in opposite circumferential directions.

24. An oil cooled piston for internal combustion engines comprising a substantially plate shaped head part, piston ring grooves in said head part, a plurality of concentric, substantially annular cooling channels in said head part, a cooling oil supply means connected with the piston and communicating with the outermost of said channels and discharging cooling oil thereinto in opposite circumferential directions, and a cooling oil relief means connected with the piston on the same diameter as said supply means is connected, said cooling oil relief means communicating with said channels to receive cooling oil flowing therefrom in two opposite circumferential directions.

25. An oil cooled piston for internal combustion engines comprising a substantially plate shaped head part, piston ring grooves in said head part, a plurality of concentric, substantially annular cooling channels in said head part, a cooling oil supply means connected with the piston and communicating with the outermost of said channels and discharging cooling oil thereinto, and a cooling oil relief means connected with the piston on the same diameter as said supply means is connected, said cooling oil relief means communicating with said channels to receive cooling oil flowing therefrom, said channels being connected to form two groups of semi-annular conduits through which the cooling oil flows from said supply means to said discharge means in opposite directions.

26. An oil cooled piston for internal combustion engines comprising a substantially plate shaped head part having piston ring grooves on its circumference, a plurality of concentric and annular cooling channels in said head part, a cooling oil supply means terminating in the outermost of said channels, and a cooling oil relief means terminating in the outermost of said channels substantially diametrically oppositely to said supply means, said channels being connected to form two groups of semi-annular conduits through which the cooling oil flows from said supply means to said discharge means in opposite directions.

References Cited in the file of this patent

UNITED STATES PATENTS

| | | |
|---|---|---|
| 2,266,192 | Grieshaber | Dec. 16, 1941 |
| 2,282,085 | Nichols et al. | May 5, 1942 |
| 2,369,907 | Moore | Feb. 20, 1945 |
| 2,449,657 | Kishline | Sept. 21, 1948 |

FOREIGN PATENTS

| | | |
|---|---|---|
| 192,759 | Great Britain | 1923 |
| 487,377 | Great Britain | June 20, 1938 |
| 520,241 | France | 1921 |
| 33,893 | France | 1928 |
| | (Addition to No. 634,700) | |
| 24,135 | Denmark | Feb. 14, 1919 |
| 67,695 | Sweden | 1926 |
| 238,210 | Switzerland | Oct. 1, 1945 |